CHAIN
Filed April 11, 1961
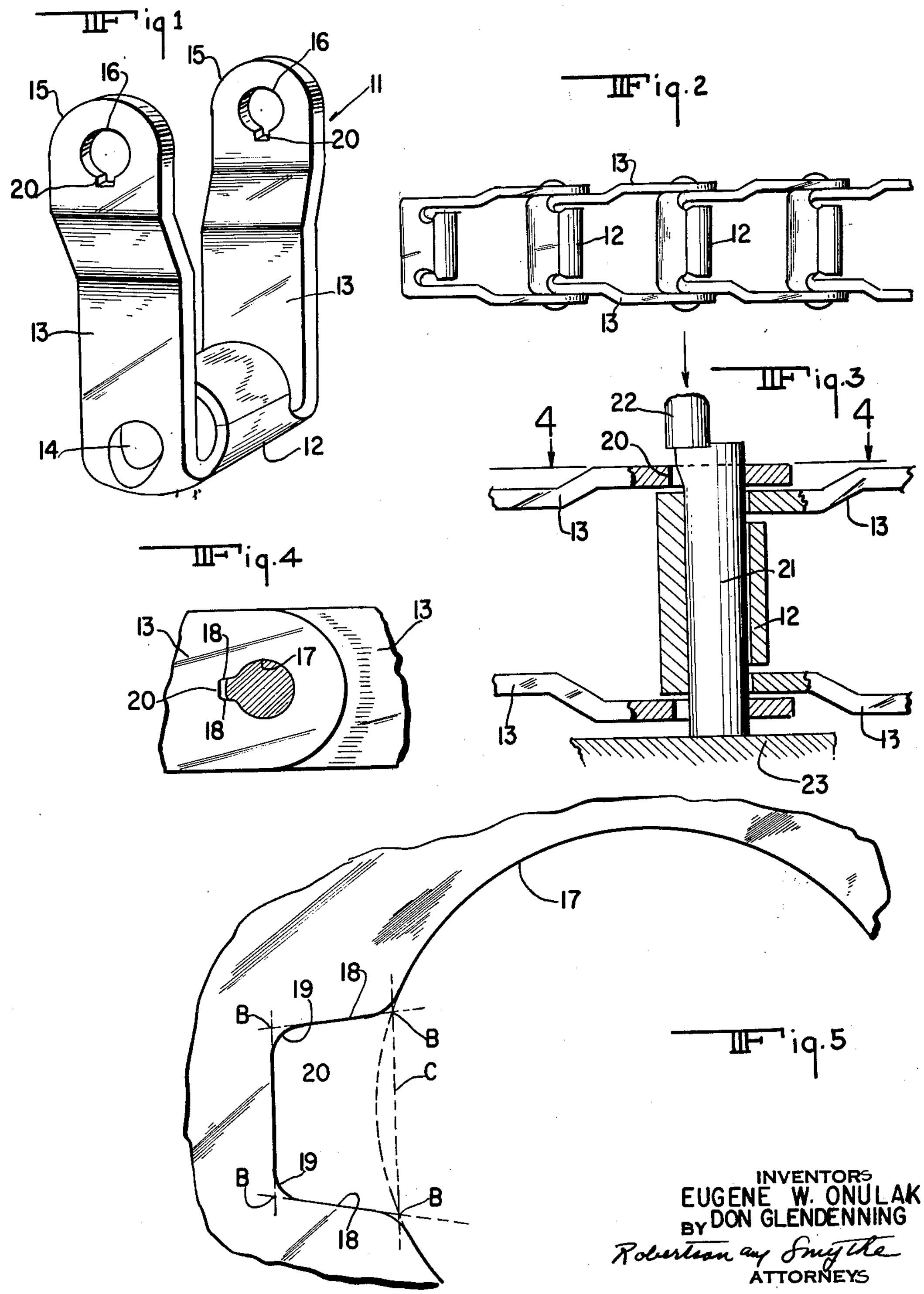
INVENTORS
EUGENE W. ONULAK
DON GLENDENNING
BY Robertson and Smythe
ATTORNEYS United States Patent Office 3,141,347

Patented July 21, 1964

3,141,347

CHAIN

Eugene W. Onulak and Don M. Glendenning, Huntington, Ind., assignors to The Locke Steel Chain Company, Huntington, Ind., a corporation of Connecticut Filed Apr. 11, 1961, Ser. No. 102,231
2 Claims. (Cl. 74—250)

This invention relates to a chain and more particularly to a means for connecting the links thereof.

One of the problems in prior chain links, such as the type shown in Patent No. 2,793,536, is the inability to adequately hold the hinge pins from rotation relative to the legs of the links.

One of the objects of the invention is to provide a link chain having increased strength and wherein the end of the pins is staked in such a manner as to flow metal into a suitable slot adjacent the apertured leg of the link through which the pin passes.

In one aspect of the invention, the non-circular leg apertures of the chain links, which are aligned with central bearing or tubular portions of the adjacent link to receive the connecting or hinge pin, are formed with a keyhole shape. The keyhole contour is preferably made to resemble a trapezoidal lobe superimposed upon a circle of relatively larger dimensions, so that a sufficient portion of the end of the hinge pins may be staked or otherwise deformed into the lobe of the corresponding leg apertures to strongly lock the pins in non-rotational position relative to the apertured legs.

Other objects, advantages and features of the invention will become apparent from the following description and drawings, which are merely exemplary.

In the drawings:

FIG. 1 is a perspective view of a chain link forming a part of the invention;

FIG. 2 is a plan view of a portion of the completed link chain;

FIG. 3 is a plan view, partially broken away, of a hinge pin being deformed by a staking tool to connect a pair of chain links;

FIG. 4 is a partial vertical sectional view taken along the lines 4—4 of FIG. 3 in the direction of the arrows; and FIG. 5 is a fragmentary view of the slotted leg apertures in the chain link shown in FIG. 1.

Referring to FIG. 1, the U-shaped chain link generally shown at 11 comprises a central cylindrically shaped tubular bearing portion 12 and a pair of leg portions 13 extending from and substantially perpendicular to the tubular portion. This may be of the type shown in said Patent No. 2,793,536. Each leg has a circular opening 14 in alignment with the cylindrically shaped tubular bearing 12. The legs are substantially parallel to each other and each preferably has a slightly outwardly offset portion 15 at their ends, such that the offset leg portions are adapted to receive the central portion of an adjacent identical link. Each offset leg portion is provided with a non-circular aperture 16 of keyhole shape. Each keyhole shaped aperture may be formed of a circular opening 17 (FIGS. 4, 5) with a substantially inverted isosceles trapezoidal shaped lobe or slot 20 extending from the circular opening. The side walls 18 of the slot have rounded corners or fillets 19 (FIG. 5) and extensions (dotted lines) of the side walls would intersect extensions (dotted lines) of the bottom of the slot 20 and circular opening at points B such that chord C (dotted lines) would be substantially parallel to the bottom of the slot or upper base of the trapezoid. The mean width of the slot or mean base of the trapezoid may approximate the radius of the circular opening.

When connecting a plurality of the links 11 to form a chain, a portion of which is shown in FIG. 2, the non-circular leg apertures of the links are aligned with the bearing portion and openings 14 of an adjacent link to receive a connecting or hinge pin 21.

As shown in FIG. 3, a portion of the end of the pin 21 is plastically deformed, or otherwise deformed, such as by staking with a staking tool 22, to move some of the deformed metal into slot 20 to substantially fill the same and thereby prevent relative rotation between the pin and apertured leg. Preferably, a flat backing surface 23 is provided to abut the opposite end of the pin. This deformation step may be performed as part of a production line assembly or otherwise. Also, both ends of the pin may be deformed simultaneously, or individually, or only one end may need to be deformed in instances when pins having a head at one end are used. When the deforming is part of production line assembly, the link may be clamped to locate the pin.

The deformed or staked end of the hinge pin 21, shown in FIG. 3, is subsequently subjected to a hot-heading, spinning or other plastically deforming operation wherein a finished head is provided for the pin. The head, of course, will be of relatively larger dimensions than the non-circular leg aperture 16, such that when both ends of the pin have an appropriate head axial withdrawal of the pin will be prevented.

It should be noted that displacing metal at one end of the pin into the corresponding slot will be sufficient to prevent relative rotation of the pin with respect to the corresponding legs of the link, yet permit necessary relative rotation between the bearing portion of the adjacent link and the hinge pin therewithin. Thus, the foregoing structure will produce a relatively stronger chain having a substantially improved flow of hinge pin metal into the slot adjacent the leg aperture of the link receiving the pin.

Provision of the rather large trapezoidal shaped slot 20 extending from the leg apertures 17 results in the advantage that a considerable amount of metal can be deformed into the slot, particularly adjacent the slot walls 18, to increase the resistance to torsional stresses by the pin during operating conditions. Also, the rather wide bottom of the slot will enhance the resistance in the adjacent area in the leg of the link to tensional forces that may develop during operating conditions.

It is to be understood that the foregoing description is merely intended for the purpose of illustration, and that the principles of the invention are not intended to be limited thereto, except as defined in the appended claims.

What is claimed is:

1. A link chain comprising a plurality of chain links and a plurality of hinge pins connecting said links, each of said links comprising a cylindrical bearing portion and a pair of substantially parallel legs extending therefrom, said legs having a transverse non-circular aperture of keyhole shape adjacent their free ends, said keyhole shape being in the form of a substantially isosceles trapezoidal lobe projecting from a circle of relatively larger dimensions, the major base of said trapezoid forming a chord of said circle, the intersecting corners of said trapezoidal lobe and said circle being rounded, the sides of said lobe being slanted toward each other in a direction away from said circle, the apertures of each link being in alignment with the bearing portion of the adjacent link, one of said pins passing through each of said aligned bearing and apertures, a portion of the end of said pins being plastically deformed and substantially filling the trapezoidal lobe portion of the corresponding leg aperture with said portion of said pins, thereby preventing relative rotation between the corresponding pins and apertured legs, said deformed end of the pins being provided with head means on the pins of larger size than the corresponding apertures.

2. A chain link comprising a cylindrical shaped tubular portion adapted to serve as a hinge bearing in an assembled chain and a pair of leg portions extending from and substantially perpendicular to said tubular portion, said leg portions each having adjacent its free end a transverse aperture, said apertures being in alignment with each other and parallel to said tubular portion, said apertures having a shape of a keyhole, said keyhole shape being in the form of a substantially isosceles trapezoidal lobe projecting from a circle of relatively larger dimensions, the major base of said trapezoid forming a chord of said circle and the sides of said lobe being slanted toward each other in a direction away from said circle, the intersecting corners of said trapezoidal lobe and said circle being rounded, so that end portions of a connecting hinge pin may be deformed to substantially fill the trapezoidal lobe portion of a corresponding leg aperture to prevent relative rotation between said hinge pin and apertured legs, whereby said link may be connected to a second identical link by securing a hinge pin in aligned second link tubular bearing and said apertures.

References Cited in the file of this patent

UNITED STATES PATENTS

| | | |
|---|---|---|
| 2,272,837 | Getz et al. | Feb. 10, 1942 |
| 2,793,536 | Onulak | May 28, 1957 |